US012006071B1

(12) United States Patent
Allison (10) Patent No.: US 12,006,071 B1
(45) Date of Patent: Jun. 11, 2024

(54) DEPLOYABLE RADIATOR PANEL SYSTEM

(71) Applicant: US Govt. as represented by Secretary of Air Force, Kirtland AFB, NM (US)

(72) Inventor: Jonathan Allison, Albuquerque, NM (US)

(73) Assignee: Government of the United States as represented by the Secretary of the Air Force, Kirtland AFB, NM (US)

( * ) Notice: Subject to any disclaimer, the term of this patent is extended or adjusted under 35 U.S.C. 154(b) by 290 days.

(21) Appl. No.: 17/191,702

(22) Filed: Mar. 4, 2021

(51) Int. Cl.
*B64G 1/50* (2006.01)
*E05D 3/02* (2006.01)
*E05F 3/00* (2006.01)
*E05F 3/22* (2006.01)
*F28D 15/04* (2006.01)

(52) U.S. Cl.
CPC ............ *B64G 1/503* (2013.01); *B64G 1/506* (2013.01); *E05D 3/02* (2013.01); *E05F 3/00* (2013.01); *E05F 3/22* (2013.01); *F28D 15/04* (2013.01); *E05D 2003/027* (2013.01); *E05Y 2900/502* (2013.01)

(58) Field of Classification Search
CPC ........ B64G 1/503; B64G 1/222; B64G 1/506; E05F 3/00; E05F 3/22; E05D 3/02; E05D 2003/027; F28D 15/04; E05Y 2900/502
See application file for complete search history.

(56) References Cited

U.S. PATENT DOCUMENTS

| | | | | |
|---|---|---|---|---|
| 2,520,536 A | * | 8/1950 | Feeley | A62C 2/242 16/222 |
| 5,117,901 A | * | 6/1992 | Cullimore | B64G 1/50 244/172.6 |
| 5,356,095 A | * | 10/1994 | Aker | B64G 1/222 244/172.6 |
| 6,439,297 B1 | * | 8/2002 | Dunbar | B64G 1/503 244/172.6 |
| 8,955,194 B2 | * | 2/2015 | Teta | E05F 1/006 16/222 |
| 2012/0293294 A1 | * | 11/2012 | Baghdasarian | H01H 85/046 337/142 |
| 2016/0107771 A1 | * | 4/2016 | Orias | H05B 3/0014 244/173.3 |
| 2018/0037341 A1 | * | 2/2018 | Kalman | B64G 1/222 |
| 2019/0144137 A1 | * | 5/2019 | Spark | B64G 1/44 244/172.6 |
| 2019/0366492 A1 | * | 12/2019 | Liu | B23P 19/04 |
| 2021/0296763 A1 | * | 9/2021 | Kawasoe | H01Q 19/10 |
| 2022/0073217 A1 | * | 3/2022 | Iverson | B64G 1/503 |

* cited by examiner

*Primary Examiner* — Christopher D Hutchens
(74) *Attorney, Agent, or Firm* — AFNWC/JA; David L. Narciso (57) ABSTRACT

A deployable radiator panel system for a small spacecraft includes fusible metal thermal hinge having a hinge leaf affixed to a spacecraft fixed radiator panel and the corresponding hinge leaf affixed to a deployable radiator panel with fusible metal filling the interstices between knuckles of each leaf to provide a conductive heat transfer path from the spacecraft fixed radiator panel through its leaf to the intervening fusible metal and then to the deployable radiator panel leaf and finally to the deployable radiator panel. A method is provided to heat and melt the fusible metal, release the deployable radiator panel from a stowed position, apply torque to open the fusible thermal metal hinge and latch the deployable radiator panel in a deployed position, and cool and solidify fusible metal.

20 Claims, 5 Drawing Sheets

FIG. 4B

DEPLOYABLE RADIATOR PANEL SYSTEM

RIGHTS OF THE GOVERNMENT

The invention described herein may be manufactured and used by or for the Government of the United States for all governmental purposes without the payment of any royalty.

Pursuant to 37 C.F.R. § 1.78(a)(4), this application claims the benefit of and priority to prior filed Provisional Application Ser. No. 62/984,715, filed Mar. 3, 2020, which is expressly incorporated herein by reference.

FIELD OF THE INVENTION

The present invention relates generally to heat transfer apparatus for spacecraft and, more particularly, to conductive heat transfer across a spacecraft hinge line.

BACKGROUND OF THE INVENTION

Spacecraft such as satellites have equipment that generates heat often in excess of any operational needs, and must reject their waste heat via infrared radiation, commonly off thermal radiators built for that purpose. Thermal radiators must be large enough to reject enough heat to keep the spacecraft within its thermal environment limits which often results in the radiator size driving the required size of the spacecraft. Spacecraft size is a first-order driver of cost of the space mission as it determines what launch vehicles may be used and whether the spacecraft can find a much cheaper 'rideshare' launch. Today, the very largest spacecraft have the option to use deployable radiator panels (DRPs) which enables the spacecraft to fit a very large heat rejection capability into a launch vehicle fairing of a defined size. The DRP is in a stowed position for launch, and then deployed at the desired time once in space. Conventional DRPs are only available for the largest spacecraft because they use a piping network to move fluid, such as through pumped fluid loops (PFL) or loop heat pipes (LHP) to transport heat (using convection) from the spacecraft to the DRP. Such fluid networks do not easily scale down to the sizes required for functional fluid connections in a smaller spacecraft. Conventional hinges use a low conductivity material (grease) that pose an environmental risk to the rest of the spacecraft, and carbon fiber thermal straps have limited applicability and require a comparatively large volume to accommodate the stowed shape if such were to be used with a DRP. As mission designers have identified the value of smaller spacecraft to replace larger heritage spacecraft, or to achieve entirely new missions, the need to reject heat loads from small satellites has been identified, particularly as improvements in small satellites require more power output and thus more resultant heat. Such small satellites can range in size from 1 U (10 cm×10 cm×10 cm) CubeSats to about ½ ESPA class spacecraft with a limited amount of conventional heat rejection capability.

SUMMARY OF THE INVENTION

The present invention overcomes the foregoing problems and other shortcomings, drawbacks, and challenges of enabling heat rejection in small satellites by providing a functional conduction path for heat across a hingeline, thus enabling use of a deployable radiator panel on a small satellite. While the invention will be described in connection with certain embodiments, it will be understood that the invention is not limited to these embodiments. To the contrary, this invention includes all alternatives, modifications, and equivalents as may be included within the spirit and scope of the present invention.

According to one embodiment of the present invention a deployable radiator panel system for a small satellite comprises spacecraft having a first hinge leaf affixed to provide heat transfer by conduction from the spacecraft to this first hinge leaf, the first hinge leaf having a first knuckle, and a deployable radiator panel having a second hinge leaf affixed to provide conduction heat transfer from the second hinge leaf to the deployable radiator panel, the second hinge leaf having a second knuckle. One of the first hinge leaf and the second hinge leaf has a third knuckle. The first knuckle, the second knuckle, and the third knuckle each have an axial centerline substantially aligned with the other axial centerlines to define a hinge axis for a hinge comprising the first hinge leaf and the second hinge leaf, and is assembled with the knuckle of the leaf not having the third knuckle interposed between the two knuckles of the leaf having the third knuckle. An interstice between each adjacent knuckle provides a clearance distance to enable relative movement, and fusible metal substantially fills the interstices between the knuckles. When solid, the fusible metal provides metallic connectivity for conductive heat transfer between the first hinge leaf and the second hinge leaf.

In another embodiment using the principles and apparatus described above, the first hinge leaf is affixed to a fixed radiator panel integral with the spacecraft and the third knuckle extends from the first hinge leaf. Each knuckle is hollow having opposite upper and lower annular surfaces and an internal cylindrical surface. A hinge pin having a cylindrical surface is retained within the knuckles extending at least from the about the upper annular surface of the first knuckle to about the lower annular surface of the third knuckle. Interstices between the hinge pin and the internal cylindrical surface of each knuckle are about the same size as the interstices between adjacent knuckle annular surfaces. Fusible metal also substantially fills the interstices between the hinge pin cylindrical surface and the internal cylindrical surfaces of each knuckle When solid, this addition fusible metal enhances the metallic connectivity for conductive heat transfer between the first hinge leaf in the second hinge leaf due to the additional area for heat transfer provided through the interstices between the pin and knuckles. At least one keeper pin can also be used to retain the hinge pin within the knuckles.

The present invention may use a thermal interface material between the first hinge leaf and the spacecraft fixed radiator; and a fastener mechanically compressing the first hinge leaf on the spacecraft fixed radiator to enhance the conductivity heat transfer.

The present invention may further include a heater added proximate the first hinge leaf knuckles to enable melting the fusible metal. A temperature sensor can also be added to enable control of the heater. In order to deploy the deployable radiator panel a deployment spring can be engaged between the deployable radiator panel and the spacecraft to provide torque to deploy the deployable radiator panel from a stowed position to a deployed position when the fusible metal is melted, and a deployment damper cooperating with the deployment spring can dampen motion of the deployable radiator panel while being deployed. A latch can be used to retain the hinge in an open position and a latch spring can be used to hold the hinge open post deployment.

The deployable radiator panel system of the deployable radiator panel has a radiating surface facing the spacecraft when in a stowed configuration prior to deployment and an opposite back surface, and a blanket can be attached over the back surface.

The present invention may have a fixed radiator panel integral the spacecraft, and each of the fixed radiator panel and the deployable radiator panel may use a heat pipe selected from the group of constant conductance heat pipes and oscillating heat pipes.

The present invention may use a fusible metal with a melting point between 60° C. and 80° C.

The present invention may use a launch lock attached to the deployable radiator panel and engaging the spacecraft in a stowed position prior to deployment of the deployable radiator panel.

In another embodiment, a deployable radiator panel system for a small satellite includes a fixed hinge leaf having a top end, a bottom end, and a hinge side. The fixed hinge leaf is fastened to a spacecraft fixed radiator panel which enables conductive heat transfer from the spacecraft radiator panel to the fixed hinge leaf. The spacecraft radiator panel has a hinge side; the fixed hinge leaf hinge side having knuckles and is aligned proximate the fixed radiator panel hinge side, with the knuckles extending from proximate the fixed hinge leaf top end to proximate the fixed hinge leaf bottom end. A rotating hinge leaf having a top end, a bottom end, and a hinge side is fastened to a deployable radiator panel enabling heat transfer from the rotating hinge leaf to the deployable radiator panel. The deployable radiator panel has a radiating surface facing the spacecraft when in a stowed configuration prior to deployment, an opposite back surface, and a hinge side. The rotating hinge leaf hinge side has knuckles and is aligned proximate the deployable radiator panel hinge side. The knuckles are each hollow having opposite upper and lower annular surfaces and an internal cylindrical surface about an axial centerline. A hinge is formed by the rotating hinge leaf knuckles being axially aligned and interposed between the fixed hinge leaf knuckles to define a hinge axis, with an interstice between each knuckle lower annular surface and the adjacent knuckle upper annular surface. A hinge pin having a cylindrical surface is retained within the knuckles along the hinge axis, with an interstice between the hinge pin cylindrical surface and each knuckle internal cylindrical surface being about the same size as the interstice between adjacent knuckles. Fusible metal substantially fills the interstices between each adjacent knuckle and between each knuckle and the hinge pin. The fusible metal, when solid, provides metallic connectivity for conductive heat transfer between the fixed hinge leaf and the rotating hinge leaf.

This embodiment may also include a heater proximate the fixed hinge leaf knuckles, and a temperature sensor proximate the heater.

This embodiment may also include a deployment spring engaged between the deployable radiator panel and the spacecraft to provide torque to deploy the deployable radiator panel from a stowed position to a deployed position when the fusible metal is in liquid state. A deployment damper cooperating with the deployment spring may also be included and will dampen motion of the deployable radiator panel while being deployed. Further, a latch to retain the hinge in an open position and a latch spring to hold the hinge open post deployment may be included.

This embodiment may further include a blanket attached over the back surface.

This embodiment may further include each of the fixed radiator panel and the deployable radiator panel having a heat pipe selected from the group of constant conductance heat pipes and oscillating heat pipes.

This embodiment may also include a launch lock attached to the deployable radiator panel and engaging the spacecraft in a closed position prior to deployment of the deployable radiator panel.

The present invention also includes a method for providing heat rejection from a small satellite. The method includes providing a fusible metal thermal hinge having a top end and a bottom end, the fusible metal thermal hinge having a fixed hinge leaf and a rotating hinge leaf, each leaf having alternating substantially cylindrical knuckles spaced from each other by an interstice. Each knuckle has an axial centerline substantially aligned with the centerlines of the other knuckles to define a hinge axis extending from the hinge top end to the hinge bottom end. Each interstice is substantially filled with fusible metal. The fusible metal thermal hinge is provided in an open position with respect to the fixed hinge leaf in relation to the rotating hinge leaf, followed by attaching the fixed hinge leaf to a spacecraft fixed radiator panel and the rotating hinge leaf to a deployable radiator panel. The method further includes installing a heater proximate the fixed hinge leaf knuckles and a temperature sensor proximate the heater, and installing a deployment spring, deployment damper. The method further includes installing a latch, and a latch spring holding the fusible metal thermal hinge in the open position, and installing a launch lock on the deployable radiator panel. With these steps completed, the method then includes heating the fusible metal thermal hinge to melt the fusible metal, releasing the latch, and moving the deployable radiator panel to a closed position, engaging the launch lock to retain the deployable radiator panel in the closed position. The fusible metal thermal hinge is then cooled to solidify the fusible metal. The method then provides for launching the small satellite. The method then provides for commanding the heater to heat the fusible metal thermal hinge to a design temperature measured by the temperature sensor sufficient to melt the fusible metal, commanding the launch lock to open allowing the deployment spring and deployment damper to rotate the deployable radiator panel into a deployed position engaging the latch, and commanding the heater to turn off, allowing the fusible metal to cool and solidify. The deployable radiator panel is then operable to enable heat from the spacecraft fixed radiator panel to be conducted to the deployable radiator panel by a heat transfer path through the fixed hinge leaf to the metallic fusible metal in solid form, in turn to the rotating hinge leaf, and finally to the deployable radiator panel.

The method may further include the step of providing a fusible thermal hinge includes the knuckles being hollow, with each knuckle having opposite upper and lower annular surfaces and an internal cylindrical surface. The fusible thermal hinge further includes a hinge pin having a cylindrical surface retained within the knuckles and fixed in place by a keeper pin proximate the top end and a keeper pin proximate the bottom end. Interstices between a knuckle lower annular surface and the adjacent knuckle upper annular surface and interstices between the hinge pin cylindrical surface and the knuckle internal cylindrical surfaces are about the same size.

The method for providing heat rejection from a small satellite may further include the steps of determining that the heat transfer capacity has diminished over time, commanding the heater to heat the fusible metal thermal hinge to a design temperature measured by the temperature sensor sufficient to melt the fusible metal and commanding the heater to turn off, allowing the fusible metal to cool and solidify. These additional steps may be useful in the event any cracks develop in the fusible metal or at the interface of the fusible metal and the pins and knuckles, such as due to orbital thermal cycling and coefficient of thermal expansion mismatch.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations described herein and in the appendices to this provisional application.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

FIG. 3 illustrates a fusible metal hinge with a cross-section FIG. 3A illustrating fusible metal between hinge components.

It should be understood that the appended drawings are not necessarily to scale, presenting a somewhat simplified representation of various features illustrative of the basic principles of the invention. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

The following description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for illustrative purposes to aid the reader in understanding the principles of the invention and the concepts contributed by the inventor to furthering the art, and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments can be combined with one or more other embodiments to form new embodiments.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others. Those skilled in the art and informed by the teachings herein will realize that the invention is also applicable to various other technical areas or embodiments.

Figure 1:
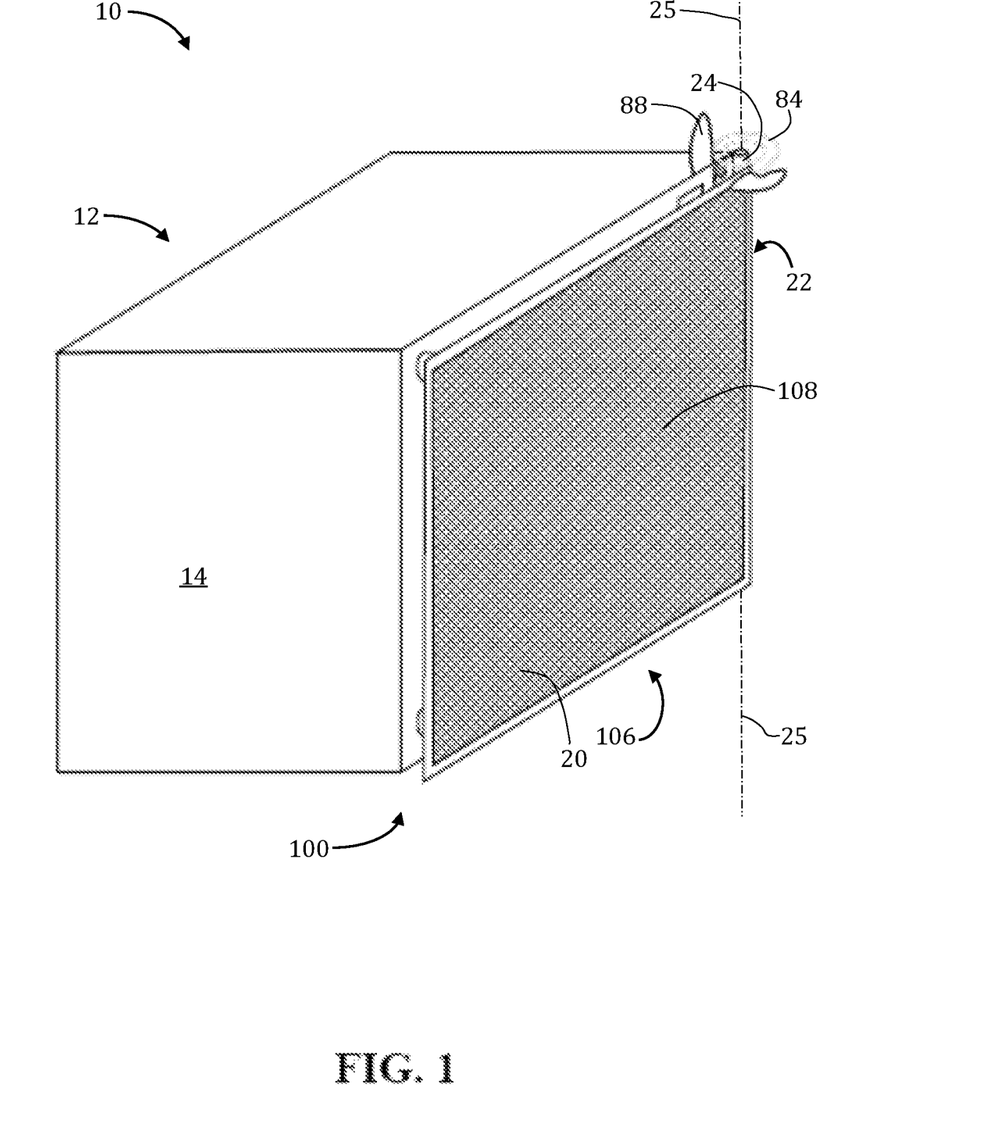
FIG. 1 illustrates a small satellite with a deployable radiator panel in a stowed position according to a method of this invention.

As depicted in the embodiment of FIG. 1, a deployable radiator panel (DRP) system 10 is depicted generally with a small satellite 12 such as a "cube satellite" shown having a DRP 20 mounted on a spacecraft 14 in a stowed position 100. In the stowed position 100 a blanket 108 (such as a "space blanket") is attached to the DRP back surface 106. The blanket 108 protects against cold temperatures while stowed and prevents high environmental heat loads that are often present on the back of the DRP from impeding the DRP's ability to reject heat when deployed. A fusible metal thermal hinge (FTH) 22 including a hinge 24 having a hinge axis 25 is mainly covered in this view by the DRP 20. The DRP 20 is held in place by both solid fusible metal within the hinge 24 and apparatus including launch locks (not visible in this view), and when deployed by a deployment spring 84 (such as a torsion spring), a deployment damper 86, a latch 88, and a latch spring 90. A heater, not visible in this view, can heat the hinge area to a temperature at which the fusible metal melt, changing from a solid to a liquid state and at which time the DRP 20 is deployed. The heater is then turned off, and the fusible metal cools and resolidifies with the DRP in the deployed position.

There are a number of design aspects that must be considered in deciding what fusible metal to use. The fusible metal must be chosen with a melting temperature above the normal operating temperature of the DRP 20 but not so high as to require excessive heater power or such that heat leaks back into the spacecraft and cause components there to be overheated. Although the launch locks hold the DRP closed prior to deployment, it is still preferred to insure that the fusible metal only melts during deployment to give the most protection against volatilized fusible metals. In the hard vacuum of space, metals that do melt can eventually volatilize away into space entirely over a timespan measured in years. Accordingly, a low liquid vapor pressure of the metal is desirable. Maintaining low volatility (i.e. low sublimation when solid or vaporization when liquid) is important since no containment mechanism is preferred between the fusible metal and sensitive spacecraft surfaces such as optics and thermal radiators. No containment mechanism is preferred for the sake of simplicity and because it is not deemed necessary. It is desired that the fusible metal have sufficient surface tension when a liquid to facilitate assembly and not create a mess during deployment testing. It also must have low enough viscosity to keep resistive torque to deployment low so that the spring and damper are not too large. The clearances between the pin and the knuckles are first order factors in determining what surface tension and viscosity are required. It is preferred that the metal have high thermal conductivity to promote heat transfer. The fusible metal must be compatible with Aluminum alloys in common use on spacecraft, and in the FTH, this eliminates Gallium, an otherwise attractive metal. The fusible metal must not form 'whiskers' in vacuum, a material tendency where soft metals such as pure or insufficiently alloyed Tin in an electric field can follow a positive feedback mechanism to grow pointy along the electric field and cause electrical shorts. Lastly, the metal should match the coefficient of thermal expansion of the knuckles and pin as closely as possible to reduce the chance of orbital thermal cycling deleteriously affecting the thermal conductance through the hinge.

Figure 2:
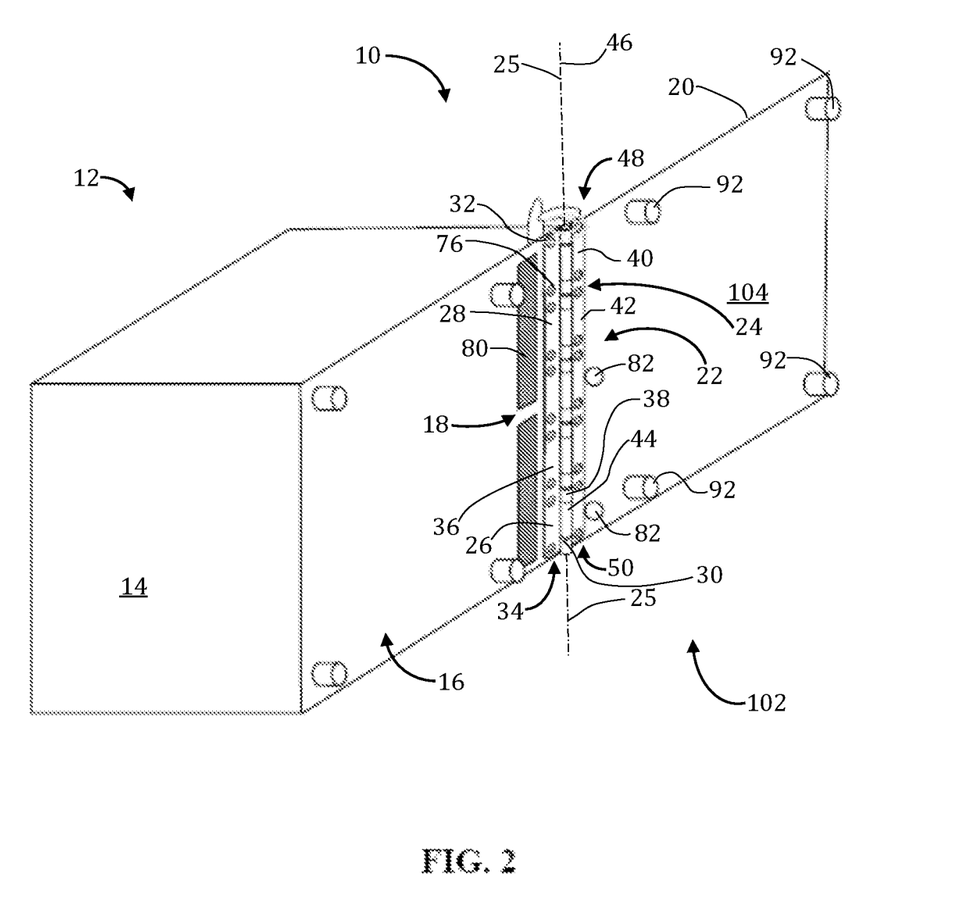
FIG. 2 illustrates a small satellite utilizing a fusible metal thermal hinge with a deployable radiator panel in a deployed position.

FIG. 2 depicts small satellite 12 with the DRP 20 with radiating surface 104 in a deployed position 102, illustrating details of one embodiment of a DRP system 10 and fusible metal thermal hinge 22. Spacecraft 14 includes a fixed radiator panel 16 with a hinge side 18, and DRP 20 includes a hinge side 21 and launch locks 92. Fusible metal thermal hinge 22 includes hinge 24 with hinge axis 25, a first hinge leaf 26, which in this embodiment is a fixed hinge leaf 28 affixed to the fixed radiator panel 16 proximate the hinge side 18 by fasteners 76, the fixed hinge leaf 28 having a top end 32, a bottom end 34, and hinge side 36. Hinge 24 also includes a second hinge leaf 40, which in this embodiment is a rotating hinge leaf 42 affixed to the DRP 20 proximate hinge side 21, the rotating hinge leaf 42 having a top end 48, a bottom end 50, and a hinge side 52. The hinge 24 depicted in this embodiment has knuckles 30, 38 on the hinge side 36 of the fixed hinge leaf 28 extending from the fixed hinge leaf 28 top end 32 to the fixed hinge leaf 28 bottom end 34, with knuckles 44 on the hinge side 52 of the rotating hinge leaf 42 interposed between the fixed hinge leaf knuckles 30, 38 extending from proximate the top end 48 to proximate the bottom and 50 of the rotating hinge leaf 42. While not shown in this view, each knuckle is hollow with opposite upper and lower annular surfaces and an internal cylindrical surface about an axial centerline 46, the knuckle axial centerlines 46 aligned with the hinge axis 25 such that a hinge pin 66, not shown, is retained within the knuckles to maintain alignment of the hinge 24. Interstices, not shown in this view, between adjacent knuckle upper and lower annular surfaces and between a hinge pin cylindrical surface and the knuckle internal cylindrical surfaces are about the same size and filled with a fusible metal. Heaters 80 are proximate the first hinge leaf knuckles, in this embodiment shown as a polyimide film heater (such as a Kapton film heater) located near the fixed hinge leaf 28 to provide a good conduction thermal path to the fusible metal. Location of the heaters needs to avoid a conduction path to the fixed radiator that would exceed an acceptable level of heat generation into the fixed radiator. Heaters could also be provided directly on the fixed knuckles 30, 38 or on the fixed hinge leaf 28, though it is not preferred to locate heaters on the knuckles of the rotating hinge leaf 42 or the DRP 20 as such would require a carrying harness across the hinge line. Other types of heaters can be used, such as cartridge heaters if higher heat flux is required than can be achieved with Kapton film heaters. Heaters 80 can be controlled via feedback mechanisms through temperature sensors 82 that are colocated with heaters. More than one temperature sensor 82 is preferable for redundancy and spatial temperature variation information, such as placing temperature sensors at about 25% and 75% of the distance from the top end 48 to the bottom end 50 of the fixed hinge leaf. While the hinge leaves may be affixed with fasteners 76, a thermal interface material such as a gap had, adhesive, or thermal filler may also be used to enhance the contact heat transfer.

After launch of the small satellite 12, when the mission calls for deployment of the DRP 20 from the stowed position 100 to the deployed position 102, a command is sent to the heaters 80 to provide heat to the fusible metal thermal hinge 22 to reach a design temperature as measured by the temperature sensors 82 sufficient to melt the fusible metal. Once the fusible metal is melted to a liquid state, launch locks 92 are commanded to open which allows the deployment spring 84 to provide torque sufficient to rotate the DRP 20 around the hinge axis 25 from the stowed to the deployed position. The deployment damper 86 works to prevent deploying in an uncontrolled manner, working with the deployment spring 84 as a passive control system to ensure that the DRP 20 deploys in a critically damped or underdamped manner. The latch 88 catches the hinge 24 and latches shut when the hinge 24 is opened, the latch spring 90 holding the hinge 24 open against torque that may be encountered post deployment. Once DRP 20 is deployed, the heaters 80 are commanded to turn off and the fusible metal cools and solidifies. Heat is then conducted from the spacecraft 14 fixed radiator panel 16 through the fixed hinge leaf 28 to the now solid fusible metal and then conducted from the fusible metal to the rotating hinge leaf 42 and finally to the DRP 20.

Figures 3, 3A:
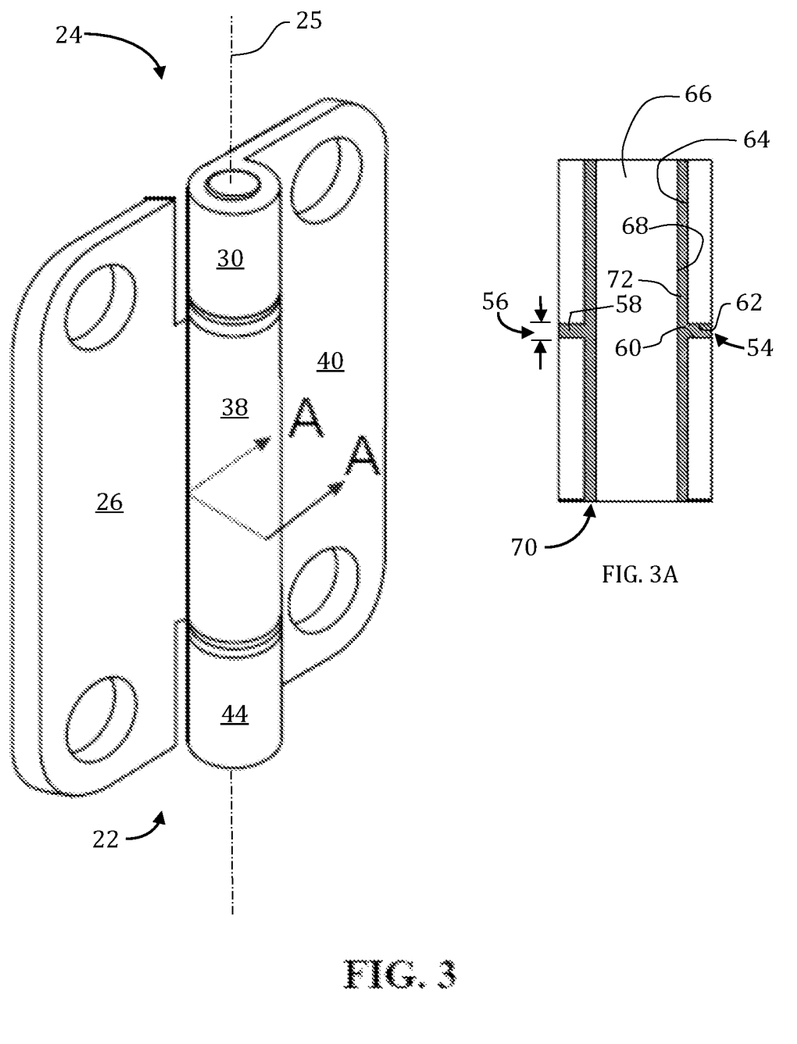

FIG. 3 illustrates a fusible metal hinge 22 as hinge 24 of an essentially conventional design with a first hinge leaf 26 having a first knuckle 30 and a third knuckle 38, and with a second hinge leaf 40 having a second knuckle 44 interposed between the first and third knuckles 30, 38. The hinge 24 is modified from a conventional design by at least the insertion of fusible metal between the hardware elements of the hinge. The first hinge leaf 26 is considered a fixed hinge leaf 28 as it's two knuckles 30, 38 fix the location of the third knuckle 44 when assembled with hinge pin 66 such that second hinge leaf 40 is considered a rotating hinge leaf 42, as it can rotate about hinge axis 25. A keeper pin 78 can be installed in the first knuckle 30 and the third knuckle 38 to retain the hinge pin within the knuckles. A cross-section along lines AA provides an expanded illustration of the fusible metal hinge elements in FIG. 3A, showing hollow knuckles 38, 44, each having an internal cylindrical surface 64 about an axial centerline 46 and opposite upper and lower annular surfaces, 60 and 62 respectively. In interstice 54 between adjacent upper annular surface 60 and lower annular surface 62 provides a clearance distance 56 between knuckles 38, 44, and an interstice 70 of about the same size is provided between hinge pin 66 cylindrical surface 68 and the internal cylindrical surface 64 of each knuckle. Fusible metal 58 is provided in the interstice 54 between knuckles and the interstice 70 provided with fusible metal 72, both of which fusible metals may be the same.

Hinge 20 can be provided in various forms, such as conventional two leaf hinge with three knuckles, a piano hinge with multiple knuckles, a stackable knuckle hinge as described below with respect to FIGS. 5A, 5B and 5C, all of which can be modified to enhance surface areas in contact with hinge elements and the fusible metal. In order to enhance conduction as a heat transfer mechanism, it is important for good contact between all surfaces. Heat transfer is enhanced with increased surface area and fusible metal direct contact.

Figures 5A, 5B, 5C:
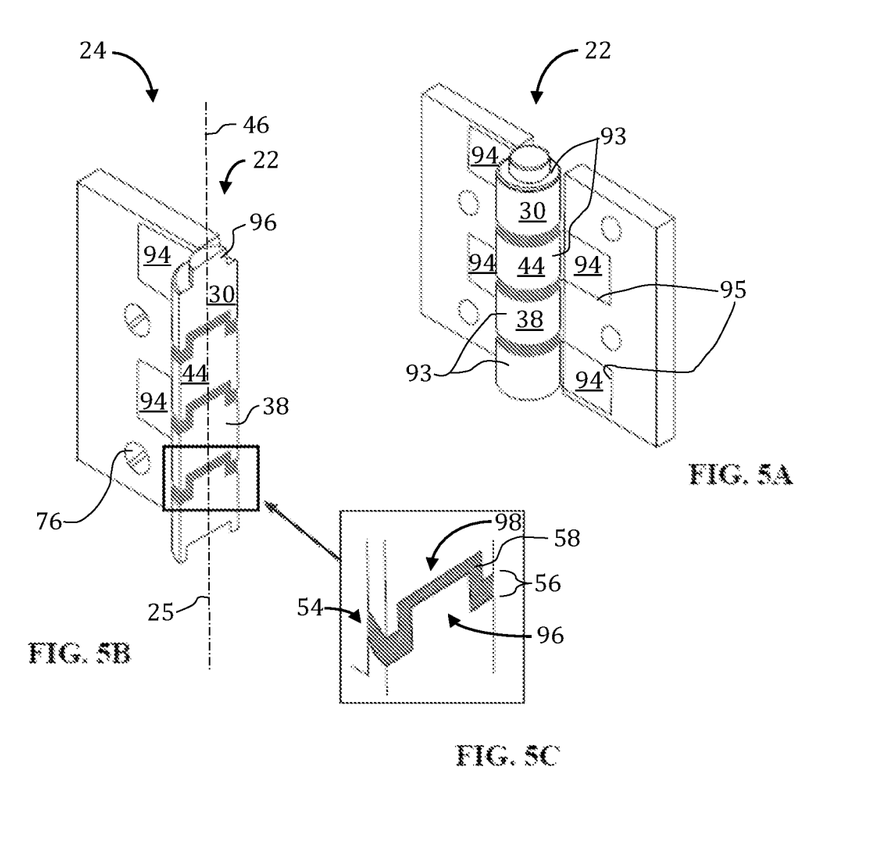
FIG. 5A, FIG. 5B, and FIG. 5C illustrate a second embodiment of a fusible metal thermal hinge in a deployed position and with enlarged and cross-section views of the hinge components and fusible metal.

In another embodiment shown in FIGS. 5A, 5B, and 5C, individual knuckles 93 with an associated projection 96 and depression 98 on opposing sides is provided to allow stacking, with each knuckle having a flange 94 that can be affixed, such as by epoxy or other adherent mechanism, to an associated leaf receptacle 95 on either the spacecraft 14 or DRP 20. This stackable design can enable enhanced fusible metal impregnation and contact for heat transfer purposes when the fusible metal is solidified. Other reference numerals are shown to reflect like features described previously.

Figure 4A:
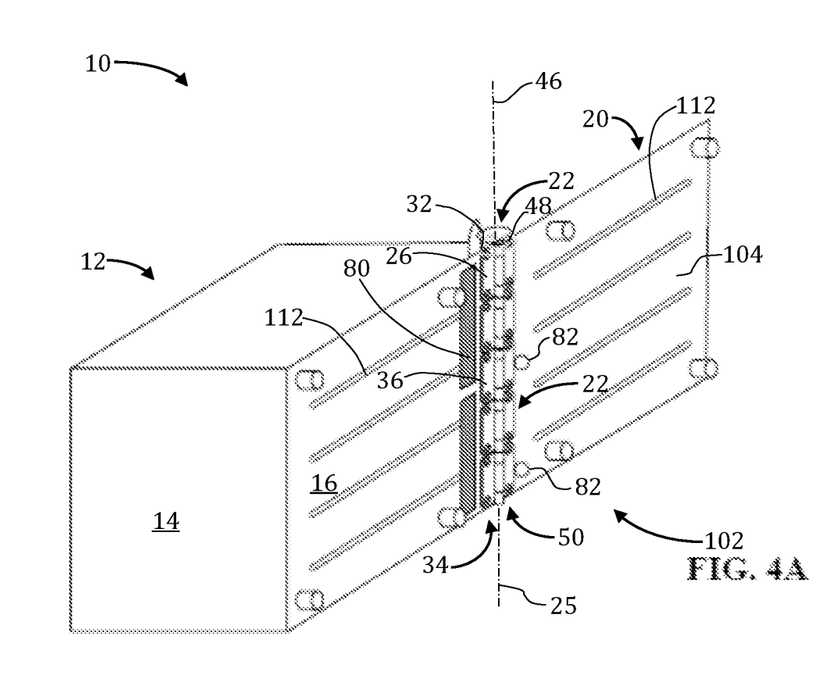
FIG. 4A and FIG. 4B illustrate constant conduction heat pipes and oscillating heat pipes used in conjunction with an embodiment of the invention.
Figure 4B:
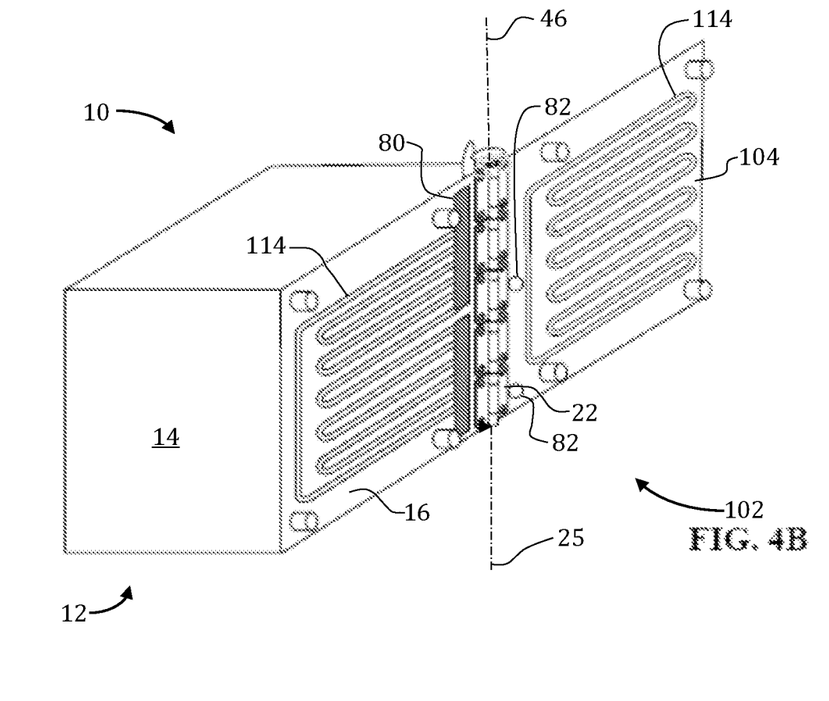

FIG. 4A illustrates a DRP system 10 used in conjunction with a constant conductance heat pipe (CCHP) 112. A CCHP 112 installed in a DRP 20 can effectively spread it's heat, enabling successful use of the fusible metal thermal hinge 22 for larger DRP's 20. The best CCHP thermal performance can be achieved if the CCHP 112 runs through the DRP 20 perpendicular to the fusible metal thermal hinge axis 25 but have a 90° bend enabling them to run near or on the deploying leaf to minimize the heat transport distance in solid material and thus maximize thermal performance of the DRP 20. FIG. 4B illustrates a DRP system 10 used in conjunction with an oscillating heat pipe 114. The type of heat pipes shown are only illustrative, any type of heat pipe can be used. An important feature is that conduction through a hinge is enabled by fusible metal while there is no need to provide convection heat transfer across the hinge line through additional hardware connecting heat pipes across the hinge line. FIG. 4A and FIG. 4B illustrate embodiments using a series of individual FTH's 22 as depicted in FIG. 3 aligned along the length of the hinge side 21 of the DRP 20 and the hinge side 18 of the fixed radiator panel 16.

In one embodiment, the FTH 20 runs the full length of the interface line between the DRP 20 and the fixed radiator panel 16. The pin diameter, knuckle thickness, and leaf thickness should all be as thin as possible to minimize mass and volume while satisfying thermal and structural requirements. The leaves are fastened to the spacecraft and the DRP with bolts and an adhesive for structural and thermal benefits. The non-melting components of the hinge (leaves/knuckles, pin, latch, spring, damper) should be made of Aluminum. The Aluminum may be of a rather more pure alloy that gives higher thermal conductivity at the cost of lower mechanical strength, which is acceptable since the hinge does not carry launch loads. The fusible metal alloy should be an alloy comprised of several metals with low melting points showing a eutectic behavior (i.e. melting point of alloy is lower than any of the constituent metals). The fusible metal should melt between 60 and 80 C, and depending on the needs and capabilities of individual spacecraft, a family of alloys with different melting points is desirable. The fusible metal should have a high thermal conductivity. The fusible metal volatilize exceedingly slowly, especially in the solid state. The metal should have low viscosity and high surface tension in the liquid state. The metal should not grow whiskers in vacuum. The metal should have a CTE matching Aluminum as closely as possible. The fusible metal is impregnated into the hinge by closing the hinge and dipping the knuckle-end of the hinge in a molten bath of the fusible metal then removing and cooling the hinge/metal combination. The end play should be about the same distance as the clearance between the pin and knuckles. The heaters should be cartridge heaters to provide sufficient heat flux and mounted on each of the fixed knuckles. The heater control scheme should include two independent heater circuits, each with 25% excess margin to melt the fusible metal in all required deployment thermal environments. The heater control scheme should have ground-commandable temperature setpoints, not hardwired setpoints. There should be two temperature sensors each mounted on a fixed knuckle, located about 25% and 75% away from one end of the FTH 22. The DRP has a backside blanket that protects against cold temperatures while stowed and against hot temperatures while deployed. In the stowed state, the DRP is attached to the fixed radiator with four launch locks which carry all of the DRP's mechanical loads during launch. CCHPs are embedded in the DRP following a route described in the section above.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A deployable radiator panel system for a small satellite comprising:
   a spacecraft having a first hinge leaf affixed to provide conduction heat transfer from the spacecraft to the first hinge leaf, the first hinge leaf having a first knuckle extending therefrom;
   a deployable radiator panel having a second hinge leaf affixed to provide conduction heat transfer from the second hinge leaf to the deployable radiator panel, the second hinge leaf having a second knuckle extending therefrom;
   one of the first hinge leaf and the second hinge leaf having a third knuckle extending therefrom;
   wherein the first knuckle, the second knuckle, and the third knuckle each have an axial centerline substantially aligned with the other axial centerlines to define a hinge axis for a hinge comprising the first hinge leaf and the second hinge leaf assembled with the knuckle of the leaf not having the third knuckle interposed between the two knuckles of the leaf having the third knuckle, wherein an interstice between each adjacent knuckle provides a clearance distance;
   fusible metal substantially filling interstices between the knuckles that, when solid, provides metallic connectivity for conductive heat transfer between the first hinge leaf and the second hinge leaf.

2. The deployable radiator panel system of claim 1 wherein the first hinge leaf is affixed to a fixed radiator panel integral with the spacecraft and the third knuckle extends from the first hinge leaf, and further wherein each knuckle is hollow having opposite upper and lower annular surfaces and an internal cylindrical surface, the deployable radiator panel system further comprising:
   a hinge pin having a cylindrical surface retained within the knuckles extending at least from about the upper annular surface of the first knuckle to about the lower annular surface of the third knuckle;
   interstices between the hinge pin and the internal cylindrical surface of each knuckle being about the same size as the interstices between adjacent knuckle annular surfaces;
   the fusible metal also substantially filling the interstices between the hinge pin cylindrical surface and the internal cylindrical surfaces of each knuckle that, when solid, provides metallic connectivity for conductive heat transfer between the first hinge leaf in the second hinge leaf.

3. The deployable radiator panel system of claim 2 further comprising:
   a thermal interface material between the first hinge leaf and the spacecraft fixed radiator; and a fastener mechanically compressing the first hinge leaf on the spacecraft fixed radiator.

4. The deployable radiator panel system of claim 2 further comprising at least one keeper pin to retain the hinge pin within the knuckles.

5. The deployable radiator panel system of claim 2 further comprising a heater proximate the first hinge leaf knuckles.

6. The deployable radiator panel system of claim 5 further comprising a temperature sensor proximate the heater.

7. The deployable radiator panel system of claim 1 further comprising:
- a deployment spring engaged between the deployable radiator panel and the spacecraft to provide torque to deploy the deployable radiator panel from a stowed position to a deployed position when the fusible metal is melted,
- a deployment damper cooperating with the deployment spring to dampen motion of the deployable radiator panel while being deployed, and
- a latch to retain the hinge in an open position and a latch spring to hold the hinge open post deployment.

8. The deployable radiator panel system of claim 1 wherein the deployable radiator panel has a radiating surface facing the spacecraft when in a stowed configuration prior to deployment and an opposite back surface, further comprising a blanket attached over the back surface.

9. The deployable radiator panel system of claim 1 further comprising a fixed radiator panel integral with the spacecraft, wherein each of the fixed radiator panel and the deployable radiator panel comprises a heat pipe selected from the group of constant conductance heat pipes and oscillating heat pipes.

10. The deployable radiator panel system of claim 1 wherein the fusible metal has a melting point between 60° C. and 80° C.

11. The deployable radiator panel system of claim 1 further comprising a launch lock attached to the deployable radiator panel and engaging the spacecraft in a stowed position prior to deployment of the deployable radiator panel.

12. A deployable radiator panel system for a small satellite comprising:
- a fixed hinge leaf having a top end, a bottom end, and a hinge side; the fixed hinge leaf fastened to a spacecraft fixed radiator panel enabling conductive heat transfer from the spacecraft radiator panel to the fixed hinge leaf; the spacecraft radiator panel having a hinge side; the fixed hinge leaf hinge side having knuckles and aligned proximate the fixed radiator panel hinge side; the knuckles extending from proximate the fixed hinge leaf top end to proximate the fixed hinge leaf bottom end;
- a rotating hinge leaf having a top end, a bottom end, and a hinge side; the rotating hinge leaf fastened to a deployable radiator panel enabling heat transfer from the rotating hinge leaf to the deployable radiator panel; the deployable radiator panel having a radiating surface facing the spacecraft when in a stowed configuration prior to deployment, an opposite back surface, and a hinge side; the rotating hinge leaf hinge side having knuckles and aligned proximate the deployable radiator panel hinge side;
- wherein the knuckles are each hollow having opposite upper and lower annular surfaces and an internal cylindrical surface about an axial centerline, and wherein a hinge is formed by the rotating hinge leaf knuckles being axially aligned and interposed between the fixed hinge leaf knuckles to define a hinge axis, with an interstice between each knuckle lower annular surface and the adjacent knuckle upper annular surface, the hinge further comprising a hinge pin having a cylindrical surface retained within the knuckles along the hinge axis, with an interstice between the hinge pin cylindrical surface and each knuckle internal cylindrical surface being about the same size as the interstice between adjacent knuckles; and
- wherein the deployable radiator panel system further comprises fusible metal substantially filling the interstices between each adjacent knuckle and between each knuckle and the hinge pin, and further wherein the fusible metal, when solid, provides metallic connectivity for conductive heat transfer between the fixed hinge leaf and the rotating hinge leaf.

13. The deployable radiator panel system of claim 12 further comprising a heater proximate the fixed hinge leaf knuckles, and a temperature sensor proximate the heater.

14. The deployable radiator panel system of claim 12 further comprising:
- a deployment spring engaged between the deployable radiator panel and the spacecraft to provide torque to deploy the deployable radiator panel from a stowed position to a deployed position when the fusible metal is in a liquid state,
- a deployment damper cooperating with the deployment spring to dampen motion of the deployable radiator panel while being deployed, and
- a latch to retain the hinge in an open position and a latch spring to hold the hinge open post deployment.

15. The deployable radiator panel system of claim 12 further comprising a blanket attached over the back surface.

16. The deployable radiator panel system of claim 12 further comprising each of the fixed radiator panel and the deployable radiator panel having a heat pipe selected from the group of constant conductance heat pipes and oscillating heat pipes.

17. The deployable radiator panel system of claim 12 further comprising a launch lock attached to the deployable radiator panel and engaging the spacecraft in a closed position prior to deployment of the deployable radiator panel.

18. A method for providing heat rejection from a small satellite comprising:
- providing a fusible metal thermal hinge having a top end and a bottom end, the fusible metal thermal hinge having a fixed hinge leaf and a rotating hinge leaf, each leaf having alternating substantially cylindrical knuckles spaced from each other by an interstice, each knuckle having an axial centerline substantially aligned with the centerlines of the other knuckles to define a hinge axis extending from the hinge top end to the hinge bottom end, each interstice substantially filled with fusible metal, the fusible metal thermal hinge in an open position with respect to the fixed hinge leaf in relation to the rotating hinge leaf;
- attaching the fixed hinge leaf to a spacecraft fixed radiator panel and the rotating hinge leaf to a deployable radiator panel;
- installing a heater proximate the fixed hinge leaf knuckles and a temperature sensor proximate the heater;
- installing a deployment spring and a deployment damper;
- installing a latch, and a latch spring holding the fusible metal thermal hinge in the open position;
- installing a launch lock on the deployable radiator panel;

heating the fusible metal thermal hinge to melt the fusible metal, releasing the latch, and moving the deployable radiator panel to a closed position, engaging the launch lock to retain the deployable radiator panel in the closed position;

cooling the fusible metal thermal hinge to solidify the fusible metal;

launching the small satellite;

commanding the heater to heat the fusible metal thermal hinge to a design temperature measured by the temperature sensor sufficient to melt the fusible metal;

commanding the launch lock to open allowing the deployment spring and deployment damper to rotate the deployable radiator panel into a deployed position engaging the latch;

commanding the heater to turn off, allowing the fusible metal to cool and solidify;

whereby heat from the spacecraft fixed radiator panel is conducted to the deployable radiator panel by a heat transfer path through the fixed hinge leaf to the metallic fusible metal in solid form, in turn to the rotating hinge leaf, and finally to the deployable radiator panel.

19. The method of claim 18 wherein the step of providing a fusible thermal hinge includes the knuckles being hollow, each knuckle having opposite upper and lower annular surfaces and an internal cylindrical surface, the fusible thermal hinge further comprising a hinge pin having a cylindrical surface retained within the knuckles and fixed in place by a keeper pin proximate the top end and a keeper pin proximate the bottom end, with interstices between a knuckle lower annular surface and the adjacent knuckle upper annular surface and interstices between the hinge pin cylindrical surface and the knuckle internal cylindrical surfaces being about the same.

20. The method for providing heat rejection from a small satellite as claimed in claim 18 further comprising the steps of:

determining that the heat transfer capacity has diminished over time;

commanding the heater to heat the fusible metal thermal hinge to a design temperature measured by the temperature sensor sufficient to melt the fusible metal; and commanding the heater to turn off, allowing the fusible metal to cool and solidify.

\* \* \* \* \*